United States Patent [19]

O'Driscoll et al.

[11] Patent Number: 4,477,024
[45] Date of Patent: Oct. 16, 1984

[54] CARBON/CARBON ROCKET MOTOR EXIT CONE REINFORCEMENT

[75] Inventors: Peter F. O'Driscoll, Los Altos; Gerald E. Crowe, Santa Clara; John Berry, Morgan Hill, all of Calif.

[73] Assignee: The United States of America as represented by the Secretary of the Air Force, Washington, D.C.

[21] Appl. No.: 482,375

[22] Filed: Apr. 5, 1983

[51] Int. Cl.³ .......................................... B63H 11/14
[52] U.S. Cl. ................................................ 239/265.11
[58] Field of Search ...................... 239/265.39, 265.41, 239/265.13, 265.15, 265.11, 265.17, 265.19, 265.23, 265.25, 265.27, 265.29, 265.31, 265.33, 265.35, 265.37, 591; 285/114

[56] References Cited

U.S. PATENT DOCUMENTS

| 3,142,960 | 8/1964 | Bluck | 239/591 X |
| 3,156,091 | 11/1964 | Kraus | 239/265.15 X |
| 3,167,909 | 4/1965 | Thielman | 239/265.15 |
| 3,261,558 | 7/1966 | Davies | 239/601 |
| 3,289,943 | 12/1966 | Thomas et al. | 239/127.1 |
| 3,313,488 | 10/1967 | Lovingham | 239/265.15 X |
| 3,390,899 | 7/1968 | Herbert et al. | 239/265.35 X |
| 3,441,217 | 11/1966 | McIntosh | 239/265.15 |
| 3,507,449 | 4/1970 | Butter | 239/127.1 |
| 3,441,217 | 11/1969 | McAllister | 239/265.15 |
| 3,635,404 | 1/1972 | Hopkins et al. | 239/265.15 |
| 3,694,883 | 10/1972 | Olcott | 29/157 C |

Primary Examiner—John J. Love
Assistant Examiner—Kevin P. Weldon
Attorney, Agent, or Firm—Donald J. Singer; Charles E. Bricker

[57] ABSTRACT

A carbon-carbon rocket motor exit cone having a threaded cylindrical section for attachment to the motor section is reinforced with a plurality of windings of carbon fiber around the cylindrical section.

3 Claims, 2 Drawing Figures

CARBON/CARBON ROCKET MOTOR EXIT CONE REINFORCEMENT

RIGHTS OF THE GOVERNMENT

The invention described herein may be manufactured and used by or for the Government of the United States for all governmental purposes without the payment of any royalty.

BACKGROUND OF THE INVENTION

The recent years, solid rocket motor exit cones have been going through a material transition. Initially, common structural materials, such as steel, aluminum and fiberglass, were used, with insulation to protect these materials from the high temperatures of the rocket motor exhaust. More recently, carbon-carbon exit cones have been developed. These structures can carry the operating pressures and thermal loads of solid rocket motors while operating at temperatures in the range of 4000° to 5000° F.

The carbon-carbon exit cones present certain problems in manufacturing. In order to attach these cones to the rest of the motor structure, i.e., to the throat portion of the rocket motor, a threaded cylindrical section is required. If the exit cone were wholly conical, fabrication would be simpler, requiring little more than helically wrapping a suitable resin-impregnated woven carbon fiber cloth around a conical mandrel, curing the resin to make the assembly freestanding, and carbonizing the freestanding assembly. Since, however, a cylindrical attaching section is required, the transition from the cylindrical section to the conical section introduces distortion of the carbon cloth. Such distortion may lead to flaws in the cylindrical section which are difficult to identify by nondestructive testing techniques. The resulting product may be an exit cone with a structurally sound conical section, but with a marginally adequate cylindrical section. It is the cylindrical section where the highest loads occur.

Accordingly, it is an object of the present invention to provide an improved exit cone for a solid rocket motor.

Other objects and advantages of the present invention will become apparent to those skilled in the art from the following detailed description, the appended claims and the accompanying drawing.

DETAILED DESCRIPTION OF THE DRAWING

Figure 1:
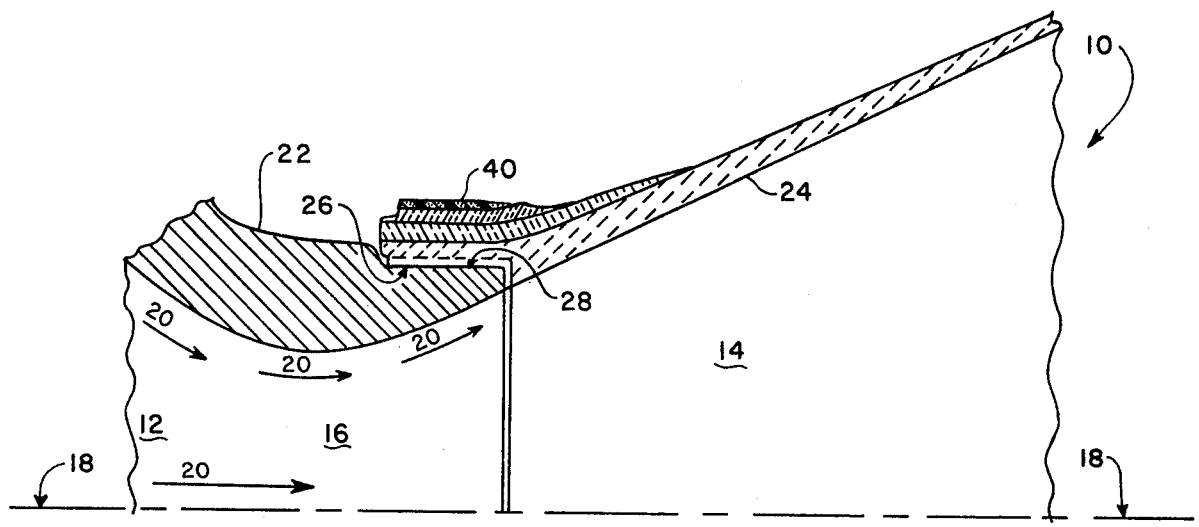
FIG. 1 is a view of a longitudinal section of a portion of a solid rocket motor nozzle.

Referring now to the drawing, FIG. 1 illustrates a rocket motor discharge nozzle assembly 10 which comprises a converging entrance section 12, a diverging exit section 14 and located therebetween, throat section 16. Also shown is the nozzle assembly longitudinal axis 18, and as indicated by the arrows 20, the direction of gaseous flow from the entrance section 12, through the throat section 16, to the exit section 14.

The throat section 16 and a portion of the entrance section 12 are formed by an integral throat and entrance piece 22, which is illustrated as being fabricated from a metal; however, piece 22 may be fabricated from any high temperature and ablation resistant material known in the art. The exit section 14 includes a carbon-carbon composite exit cone 24 which is connected to the throat and entrance piece 22 by a threaded connection comprising outside threads 26 on the throat and entrance piece 22 and inside threads 28 on the exit cone 24.

Figure 2:
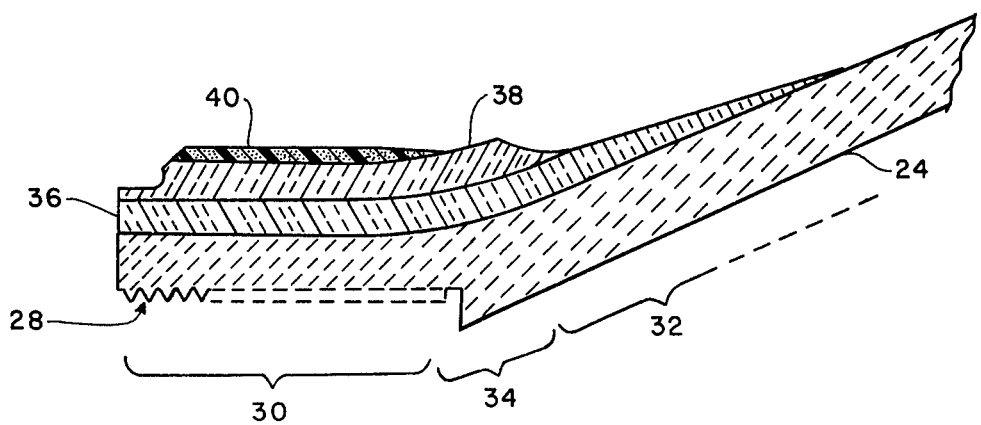
FIG. 2 is an enlarged view of a portion of the nozzle shown in FIG. 1.

Referring now to FIG. 2, the exit cone 24 has a cylindrical portion 30, a diverging conical portion 32, and therebetween, a transition portion 34.

The exit cone 24 is fabricated in accordance with procedures known in the art from conventional (2D) woven carbon fiber fabric impregnated with a suitable resin, such as a phenolic resin. The resin-impregnated fabric is assembled in suitable fashion upon a male mandrel. The uncured laminate is then transferred to a female die for curing and the male mandrel is withdrawn. Following curing of the resin, the now freestanding preform may be skin machined and prepared for carbonization.

The carbon precursor resin is converted to carbon by a suitable heat treatment. Following each such heat treatment the composite may be impregnated with a thermosetting resin or a thermoplastic carbon precursor, such as a phenolic resin, a furanyl resin, coal tar pitch, and the like, that can be converted to carbon by heat treatment. The impregnation and carbonization cycle may be repeated as often as necessary to densify the composite to a desired degree. The thus-carbonized composite may then be graphitized by a suitable heat treatment. In the final densified condition the composite is machined to desired dimensions, including the inside threads 28.

The carbon-carbon exit cone 24 is provided with two insulating layers 36 and 38 which overlay the cylindrical portion 30 and the transition portion 34 and which taper outwardly into the conical portion 32. The first layer 36 consists of a resin-impregnated woven (2D) carbon fiber fabric tape which is wound spirally around the cone 24, and then cured. The second layer 38 consists of a resin-impregnated woven (2D) high-silica cloth tape which is wound spirally over the first layer and then cured. The tapes employed in these first and second layers are preferably pre-impregnated with a phenolic resin.

The cylindrical portion 30 of the exit cone 24 is reinforced by a layer 40 consisting of a plurality of helical windings of carbon filament, such as Thornel 300/6000, available from Union Carbide Co., New York, N.Y., in the form of yarn, roving or the like, embedded in a cured epoxy resin. In preparation for applying the reinforcing layer 40, the exit cone 24 having the insulating layers 36 and 38 thereon is mounted on a lathe or lathe-like filament winding apparatus. Such lathe or apparatus should have a reversible carriage for carrying a filament guide in either direction parallel to the axis of rotation of the cone mounted on the lathe or apparatus. During the winding step, the carbon filament is first impregnated with an epoxy resin, such as EPON 828, available from Shell Chemical Co., Houston, Tex., containing a curing agent and, optionally, other conventional ingredients. The epoxy-impregnated filament is then wound onto the cylindrical portion 30 under desired tension in helical fashion, reversing the direction of the carriage as necessary, until the layer 40 has a desired thickness. Generally, the layer 40 should have a thickness of at least two and up to 10 helical windings of the epoxy-impregnated carbon filament, preferably about four windings.

Alternately, a subassembly comprising the insulating layers 36 ad 38 and the reinforcing layer 40 may be fabricated on a suitable mandrel, cured, and then the subassembly may be bonded to the exit cone 24 using a suitable adhesive, such as an epoxy resin.

Various modifications may be made to the present invention without departing from the spirit thereof.

We claim:

1. In a carbon-carbon exit cone for a rocket motor, which cone comprises a densified, carbonized laminate fabricated from a plurality of plies of phenolic resin-impregnated woven carbon cloth; which cone has a cylindrical section, a conical section and a transition section between and integral with said cylindrical section and said conical section, said cylindrical section having inside threads for connecting said cone to the throat piece of said rocket motor, said conical section diverging outwardly from said transition section; said cone comprising a first layer of cured material surrounding said cylindrical section, said transition section and a portion of said conical section, said first layer being fabricated from a plurality of spiral windings of phenolic resin-impregnated carbon fiber cloth tape, said cone yet further comprising a second layer of cured material surrounding said first layer above said cylindrical section and said transition section, said second layer being fabricated from a plurality of spiral windings of phenolic resin-impregnated high silica cloth tape; the improvement which comprises a third layer of cured material surrounding said second layer above said cylindrical section, said third layer being fabricated from helically wound epoxy resin-impregnated carbon fiber.

2. The cone of claim 1 wherein said third layer has a thickness of about 2 to 10 helical windings of said impregnated fiber.

3. The cone of claim 2 wherein said third layer has a thickness of 4 helical windings.

* * * * *